United States Patent
Cowley et al.

(10) Patent No.: US 8,800,936 B2
(45) Date of Patent: Aug. 12, 2014

(54) UNMANNED AERIAL VEHICLE DRAG AUGMENTATION BY REVERSE PROPELLER ROTATION

(75) Inventors: Martyn Cowley, Simi Valley, CA (US); Matthew Todd Keennon, Simi Valley, CA (US)

(73) Assignee: AeroVironment, Inc., Monrovia, CA (US)

( * ) Notice: Subject to any disclaimer, the term of this patent is extended or adjusted under 35 U.S.C. 154(b) by 325 days.

(21) Appl. No.: 13/007,515

(22) Filed: Jan. 14, 2011

(65) Prior Publication Data

US 2012/0181388 A1    Jul. 19, 2012

(51) Int. Cl.
  *G05D 1/00*     (2006.01)
  *G05D 1/06*     (2006.01)
  *G05D 1/12*     (2006.01)
  *B64C 11/08*    (2006.01)

(52) U.S. Cl.
  USPC ...................................... 244/188; 244/110 B

(58) Field of Classification Search
  USPC ............... 244/188, 186, 185, 182, 180, 113, 244/110 D, 110 B, 138 A, 99.12, 904, 903
  See application file for complete search history.

(56) References Cited

U.S. PATENT DOCUMENTS

| 1,754,397 | A | * | 4/1930 | Neustatter | 244/113 |
| 2,193,375 | A | * | 3/1940 | Papritz | 244/12.1 |
| 2,716,009 | A | * | 8/1955 | Hoke, Jr. | 244/110 B |
| 3,730,459 | A | * | 5/1973 | Zuck | 244/904 |
| 6,450,456 | B1 | * | 9/2002 | Greene | 244/186 |
| 2010/0083631 | A1 | * | 4/2010 | Foster et al. | 60/39.15 |

* cited by examiner

Primary Examiner — Tien Dinh
Assistant Examiner — Richard R Green
(74) Attorney, Agent, or Firm — Brooks Acordia IP Law, P.C.

(57) ABSTRACT

An air vehicle configured to augment effective drag to change the rate of descent of the air vehicle in flight via propeller shaft rotation direction reversal, i.e., thrust reversal.

8 Claims, 5 Drawing Sheets

UNMANNED AERIAL VEHICLE DRAG AUGMENTATION BY REVERSE PROPELLER ROTATION

FIELD OF ENDEAVOR

Embodiments pertain to aircraft propulsion by a fixed-pitch propeller, and more particularly to effecting descent rate and landing approach angle changes via reverse rotation of the propeller.

BACKGROUND

A U.S. Pat. No. 3,730,459 that issued May 1, 1973 to Zuck discloses an aircraft having floating wings with non-stalling characteristics, and a pusher propeller having blades of variable pitch. When its blades are set to a negative pitch angle in flight, the pusher propeller reverses the direction of thrust and effects a reduced descent angle of the aircraft.

Radio-controlled, unmanned planes may use an electrical motor to drive the rotation of a propeller shaft. A synchronous electric direct current (DC) or alternating current (AC) motor may be employed in an aircraft. The current-to-torque and voltage-to-speed relationships of the electric motor are generally linear.

SUMMARY

Embodiments include methods of in-flight descent angle augmentation and air vehicles so equipped. For example, an air vehicle may comprise: (a) at least one propeller, each propeller comprising at least one blade, e.g., a blade with a counterweight, or a plurality of blades, where at lease one blade has a constant pitch angle; (b) at least one propeller motor configured to reverse the propeller rotation rate of at least one propeller while the air vehicle is in flight; and (c) an autopilot configured to maintain the airspeed of the air vehicle above stall conditions while the air vehicle is in flight. The motor may be configured to drive the fixed-pitch propeller via a propeller shaft, and wherein the motor is an electrical motor configured to drive the propeller shaft in two angular directions. The at least one propeller may be at least one forward-mounted tractor propeller and/or the at least one propeller is at least one aft-mounted pusher propeller.

The exemplary at least one blade may comprise a constant pitch angle. For example, the exemplary at least one blade may comprise a blade angle-of-attack greater in value at the root than at the tip. Also, for example, the exemplary at least one blade may comprise a blade angle-of-attack having substantially the same value at the root as at the tip.

An exemplary method of in-flight augmentation of an air vehicle descent rate may comprise: (a) generating an input to effect a change in the in-flight descent rate of the air vehicle via rotation rate reversal of at least one propeller of the air vehicle, each propeller comprising at least one blade having a constant pitch angle; and (b) rotating, via a motor and responsive to the input, the propeller shaft in a direction of rotation for generating forward air vehicle thrust. The method may further comprise regulating, via an autopilot, an airspeed value of the air vehicle. The motor driving the at least one propeller may be an electrical motor configured to drive the at least one propeller in two angular directions. The at least one propeller may be at least one forward-mounted tractor propeller and/or the at least one propeller may be at least one aft-mounted pusher propeller.

BRIEF DESCRIPTION OF THE DRAWINGS

Embodiments of the present invention are illustrated by way of example and not limitation in the figures of the accompanying drawings, and in which.

DETAILED DESCRIPTION

Figure 1A:
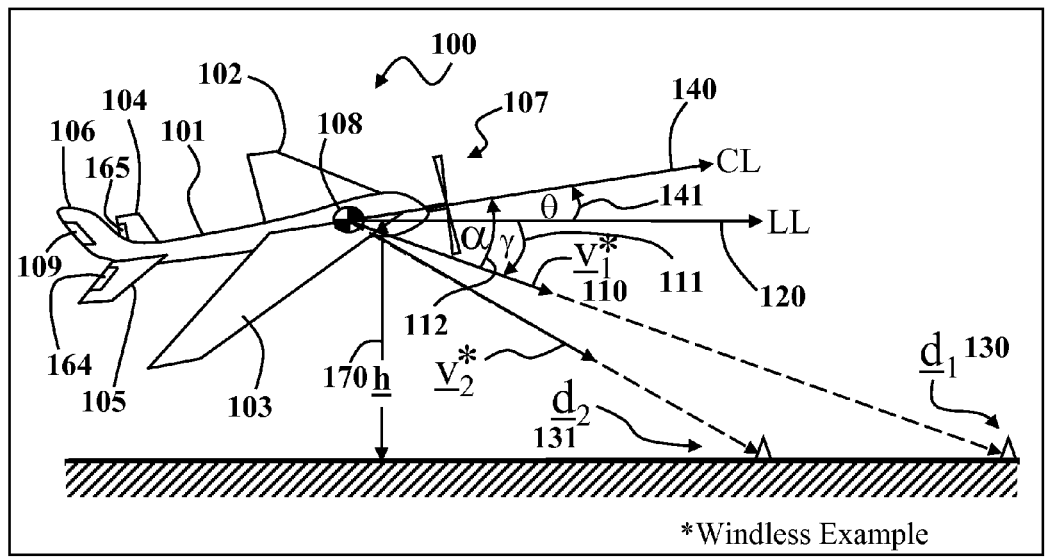
FIG. 1A depicts an exemplary air vehicle.
Figure 1B:
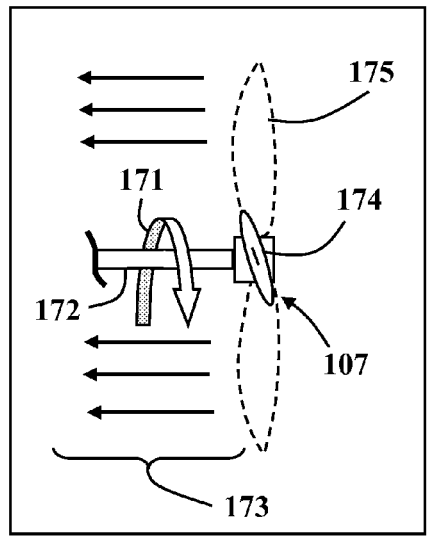
FIG. 1B depicts a tractor propeller portion of FIG. 1A rotating in a direction to generate aftward-directed thrust.
Figure 1C:
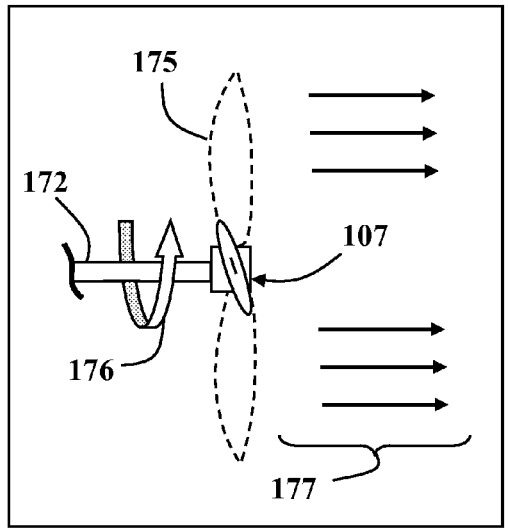
FIG. 1C depicts a tractor propeller portion of FIG. 1A rotating in a direction to generate forward-directed thrust.

FIG. 1A depicts an air vehicle with autopilot 100 having a fuselage 101, a port wing 102 and a starboard wing 103, that may be a flying-wing configuration, and may optionally include a starboard horizontal stabilizer 105 and a port horizontal stabilizer 104, a vertical tail 106 with an optional rudder 109, and a tractor propeller 107. The air vehicle 100 may be characterized by a center of mass (CM) 108, and a velocity vector 110, $V_1$, subtending a local level (LL) 120 horizon, represented by a maximum characteristic sink rate descent angle 111, $\gamma$, for any given vehicle configuration and mass. Accordingly, if the air vehicle 100 descended along the a velocity vector 110, $V_1$, i.e., the descent angle 111, $\gamma$, then the air vehicle 100 would be expected to arrive on the ground at a downrange destination 130, $d_1$. For purposes of illustration, the geometry depicted in FIG. 1 is a still air (windless) example. The air vehicle 100 is depicted as having a centerline (CL) 140 pitched above the local level (LL) 120, represented by the pitch angle 141, $\theta$. Also depicted is the angle between the centerline (CL) 140 and the velocity vector 110, $V_1$, which is termed the angle-of-attack 112, $\alpha$. The air vehicle 100 may be, in the aerodynamic sense, inherently statically stable with additional autopilot stabilization effects. So, pitch stability produced is the product of both inherent stability and augmented control inputs that may generate sufficient angle-of-attack 112 to maintain flight trim attitude in equilibrium, whether this be in level, climbing, or decending flight for any given aircraft configuration, mass, and drag. However, decent rate can be modified by means of additional drag derived from the reversed thrust propeller rotation which will thereby also arrest any undesired increase in airspeed that follows from an increased descent angle. Depicted also in FIG. 1A is a desired velocity vector, $V_2$, that would require an increased descent angle in order for the air vehicle 100 to arrive at a shortened downrange destination 131, $d_2$. FIG. 1B depicts a tractor propeller portion of the propeller 107 of FIG. 1A rotating in a direction 171 about the propeller shaft 172 to generate aftward-directed thrust 173. The volume swept by the propeller blades 174 defines the propeller disc 175. The exemplary propeller may comprise two blades as depicted, more that two blades, or at least one blade, e.g., a blade with a counterweight, where at lease one blade or the propeller has a static pitch angle. FIG. 1C depicts the tractor propeller portion of the propeller 107 of FIG. 1A rotating in a direction 176 to generate forward-directed thrust 177, which effectively creates additional drag in the direction of forward flight, in proportion to the sweep propeller disc area and the reverse power delivered to the airstream.

Figure 2A:
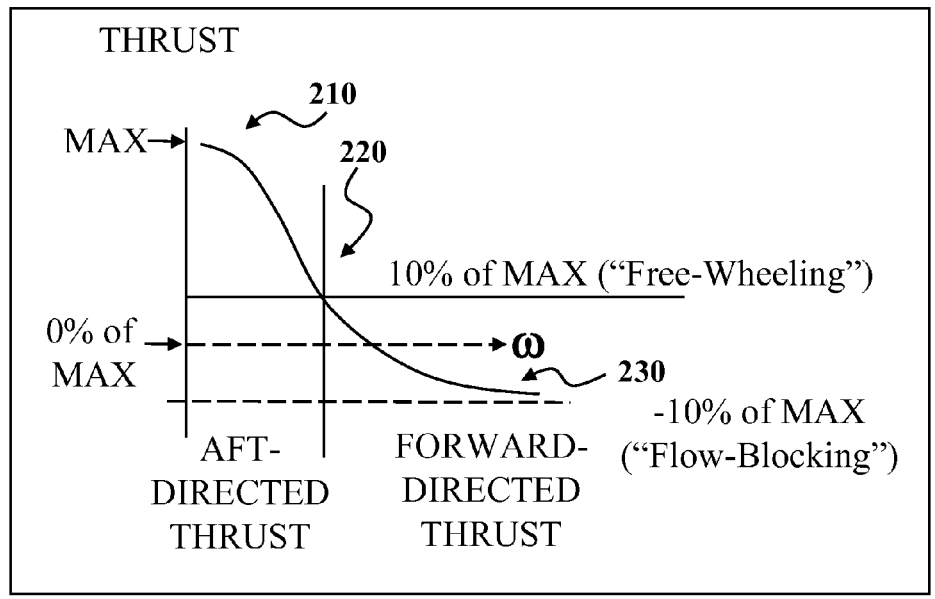
FIGS. 2A and 2B are charts of the exemplary airflow or thrust characteristics of a tractor propeller having blades with fixed pitch angles and variable rotation rate.
Figure 2B:
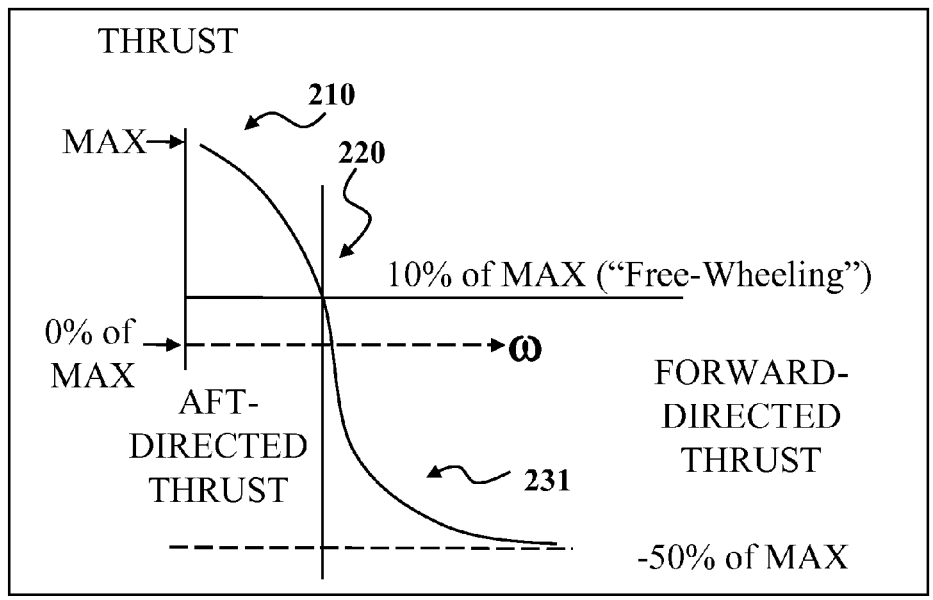

FIG. 2A is a chart depicting the airflow or thrust characteristics of a tractor propeller having blades with fixed pitch angles and variable rotation rate, ω. When the propeller rotates at its maximal operational rate, the propeller generally generates its maximal thrust 210, the aftward-directed airflow, or aftward-directed thrust, is also at its maximum. The rotation rate of the propeller may be reduced to a rate commensurate with what would otherwise be the pin-wheeling of the propeller blade for a particular airspeed. The reduced rate of pin-wheeling rotation generates reduced drag on par with a feathered propeller having blades of adjustable pitch. For example, a propeller rotation rate of nominally 10% of the maximal operational rate 220 may cause the propeller to add negligibly to the thrust and/or drag of the air vehicle. By rotating the propeller in a reverse direction below, particularly below this minimal value, the propeller effectively begins to block the aftward flow of air through the propeller disc, i.e., through the aircraft-relative, cylindrical volume swept by the rotating propeller. For example, a propeller rotation rate producing −10% of the maximal operational rate thrust 230, if nominally equal an opposite to the oncoming airflow will tend to cause the propeller to function aerodynamically as a flat-plate drag element due to the forward-directed thrust opposing the natural oncoming airflow. Air vehicles that rely on wings much more than fuselage for lift are not expected to be catastrophically impacted by the commensurate disruption of airflow by the propeller rotating in reverse, e.g., in the case where the autopilot commands re-trim the air vehicle path to a steeper descent flight path to maintain constant airspeed above the minimal stall value. FIG. 2B is a chart depicting the airflow or thrust characteristics of a tractor propeller having blades with fixed pitch angles and variable rotation rate, ω, where the thrust reversal may be produced by the propeller generating −50% of the maximal operational reverse thrust 231.

Figure 3:
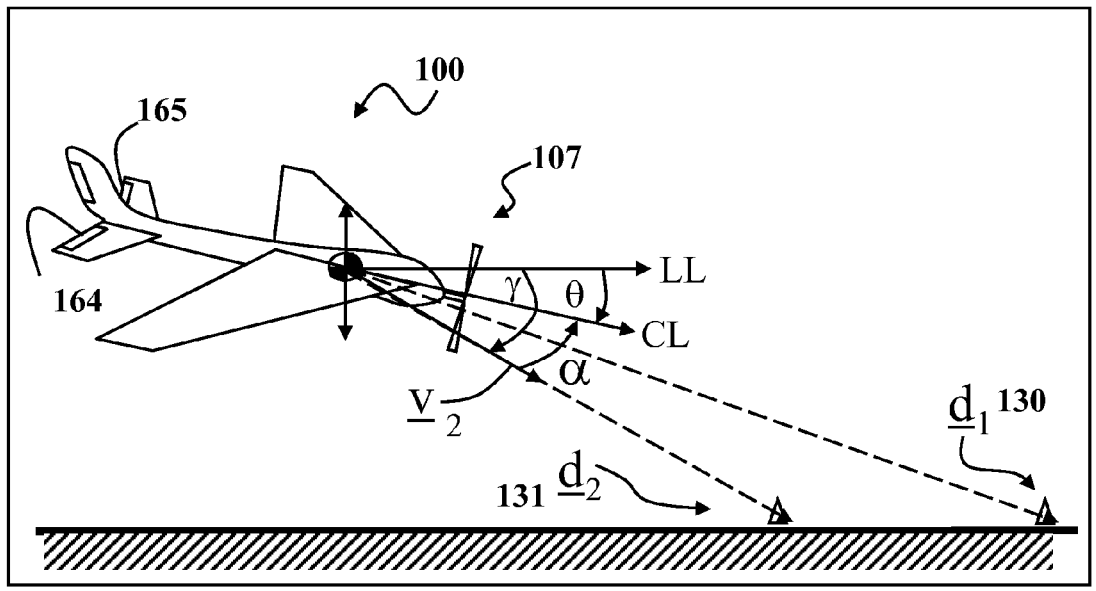
FIG. 3 depicts an exemplary air vehicle.

FIG. 3 depicts the air vehicle 100 where the tractor propeller 107 is rotating in the reverse direction to effectively shorten the horizontal component of the original velocity vector 110, $V_1$ (FIG. 1), to generate the desired velocity vector, $V_2$, having a descent angle greater than that depicted in FIG. 1. The air vehicle 100 of FIG. 3 is depicted as having a centerline (CL) below the horizon, or local level (LL). The air vehicle 100 of FIG. 3 is depicted as having a non-zero vector angle-of-attack relative to the airflow about the aircraft, α, and so the air vehicle 100 performs a controlled descent, with airspeed maintained in equilibrium by the autopilot controlling the descent angle, or airspeed, against the increased drag from the propeller disc. Accordingly, the air vehicle 100 is depicted as expected to arrive at a shortened downrange destination 131, $d_2$.

Figure 4:
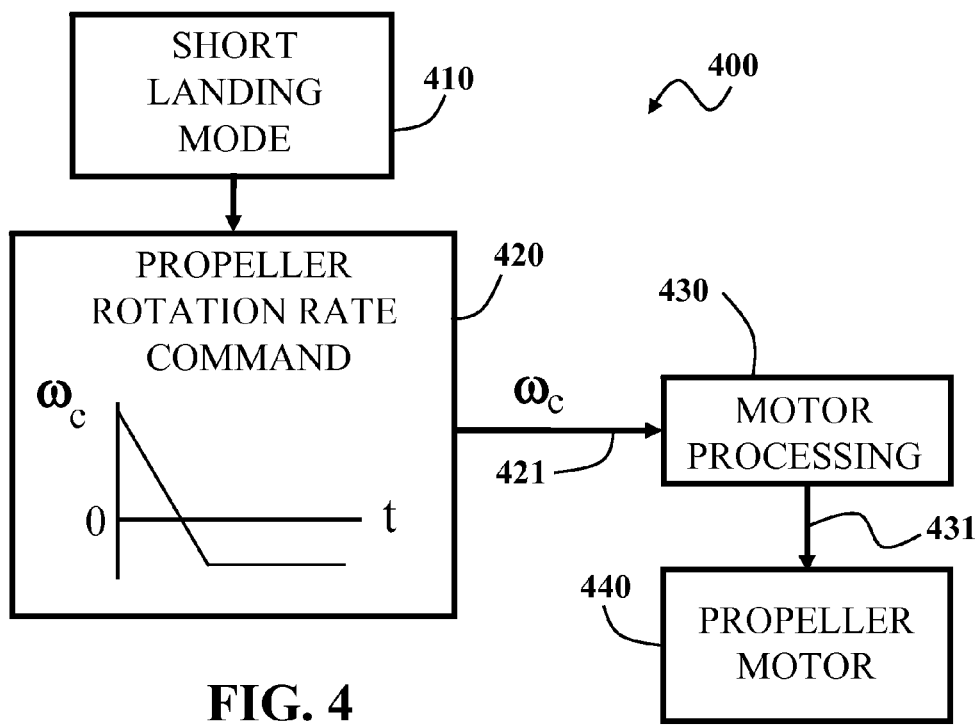
FIG. 4 is a functional block diagram of an exemplary avionics embodiment.

FIG. 4 is a functional block diagram 400 depicting an avionics embodiment where the operation mode invoked is a short landing mode 410. The rotation rate commands, $\omega_c$, may be stored as a time series 420, e.g., the rotation rate command value, $\omega_c$, as a function of time (t). The rotation commands may be provided 421 for motor processing 430 for the rotation of the propeller to be slowed, stopped, and then reversed in spin rate, albeit opposite in rotational direction, to that expected for the propeller to pin-wheel, or free wheel, at the airspeed at which the propeller rotational reversal is engaged. Embodiments include reversed rotation rates and values of propeller rotation rate commands, $\omega_c$, of up to about 50% or greater of the maximal spin rate of the propeller by the motor. The motor processing may convert the propeller rotation rate command, $\omega_c$, into a voltage 431 to a propeller motor 440 such as a brushed or brushless direct current motor, or electronically commutated AC motor. A reversal of propeller rate command would in turn be provided, via the motor processing, to the motor as a voltage of opposite polarity, e.g., a negative voltage if the non-reversal propeller rate command was a positive voltage, or a reverse phase command for an AC motor.

The reversal of the propeller rotation may be effected in cooperation with an autopilot. Generally, the autopilot may be configured to maintain the air vehicle in trim. Maneuver limits within the autopilot signal processing, and/or propeller thrust minimums, may be implemented and imposed to prevent the air vehicle from maneuvering, and/or decreasing airspeed, into a stall condition. In an instance where the reversal of the propeller rotation is effected, the autopilot may command flight trim to reduce the angle-of-attack of the air vehicle below the angle sufficient to maintain level flight—so as to maintain constant forward airspeed in decent, and thereby avoid a stall condition. The autopilot dynamically commands flight trim to maintain angle-of-attack and airspeed below the magnitude of angle-of-attack of a stall condition, and in so doing, produces an increased decent rate of the air vehicle appropriate and proportional to the extra drag introduced by the amount of reverse thrust being applied in this condition.

Figure 5A:
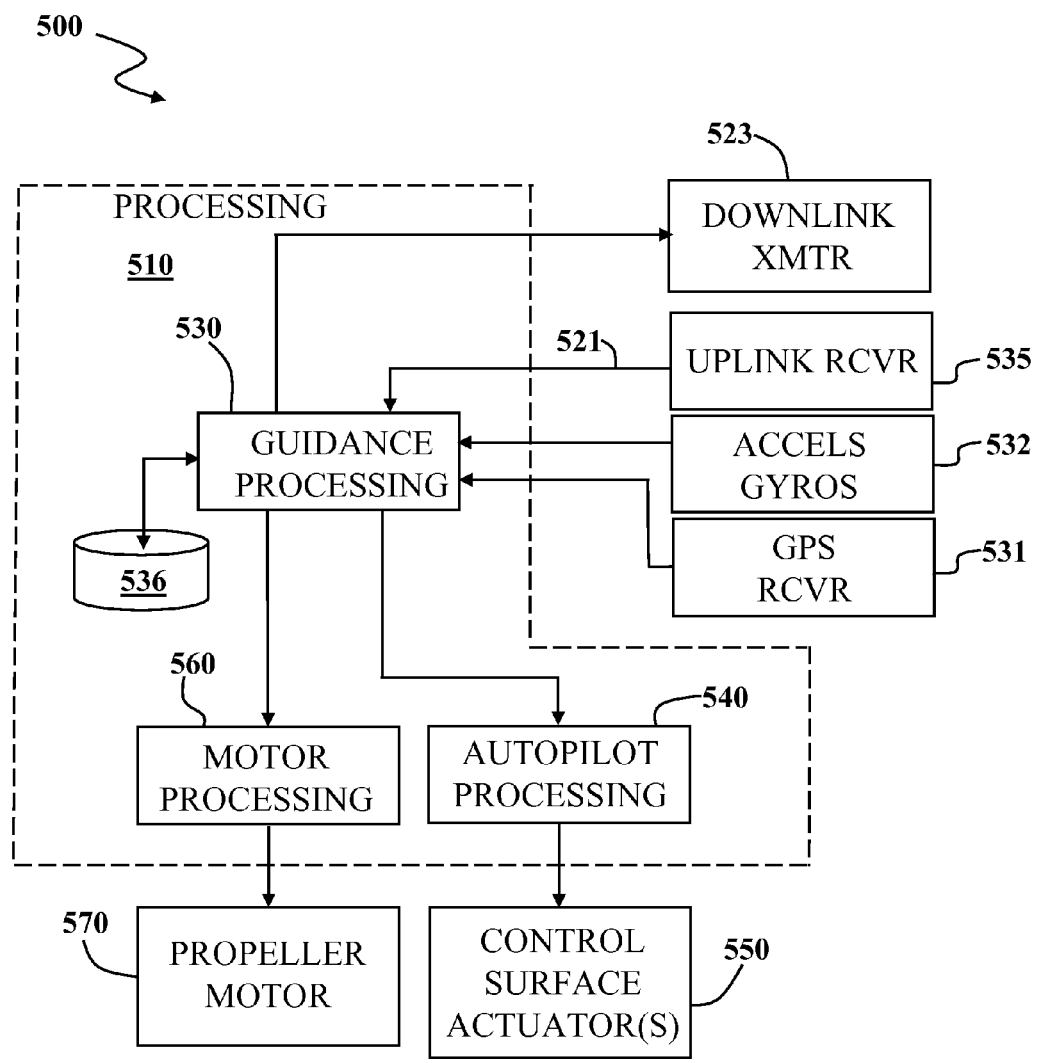
FIG. 5A is a functional block diagram of air vehicle avionics.

FIG. 5A is a functional block diagram of air vehicle avionics 500 where avionic processing 510 is depicted as taking in signals from an uplink receiver 535 and primarily an airspeed sensor and optionally one or more of the following onboard sensors: altitude, heading, rate and/or angular rate gyroscopes and one or more linear accelerometers 532, and position, velocity, and time information from a GPS receiver 531. The avionic processing 510 is also depicted as outputting signals to a downlink transmitter 523, a propeller motor 570, and one or more control surface actuators 550. The guidance processing 530 of the avionic processing 510 may read values such as waypoints, flight parameters, mode thresholds, filter values, autopilot gains, and/or guidance law gains from an onboard memory store 536 and/or receive any or all such values 521 via the uplink receiver 535. Based on the guidance processing 530, the motor processing 560 may send rotation rate commands, in the exemplary form of voltage or reverse phase commands, to the propeller motor 570, e.g., to a propeller motor that may be an electrical motor. Based on the guidance processing 530, the autopilot processing 540 may send control surface actuation commands, in the exemplary form of voltage commands to servos. The guidance processing 530 may be configured to estimate the flight path airspeed of the air vehicle in order to maintain the minimal necessary airspeed above stall, and command the estimated flight path angle in proportion to the value of reverse thrust being commanded to maintain this minimum above stall speed in equilibrium.

Figure 5B:
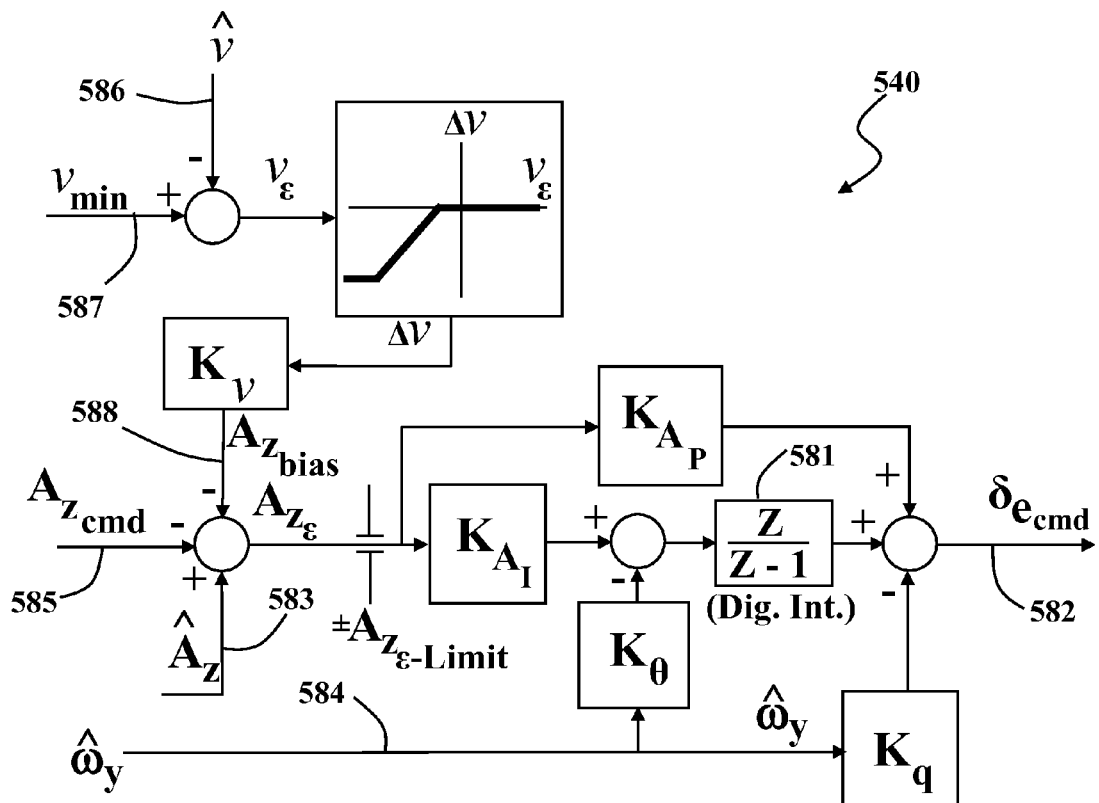
FIG. 5B is a functional block diagram of an exemplary pitch channel of an autopilot.

FIG. 5B is an exemplary pitch channel of an autopilot 540 of FIG. 5A. The exemplary functional block diagram of FIG. 5B depicts a proportional-integral gain topology, with a digital integrator 581, where the output 582 commands flight trim actuators based on estimates of vehicle linear acceleration in the z (down) direction 583, $\hat{A}z$, estimates of the pitch rate of the vehicle 584, $\hat{\omega}_y$, i.e., the angular rotation rate ω about the y axis (i.e., the lateral axis orthogonal to z), and for a biasing path: the airspeed, v. Accordingly, the exemplary pitch channel signal processing of the autopilot may effect changes in flight via flight trim actuator commands 582, $\delta e_{cmd}$. Operationally, when the propeller is reversed in its angular rotation, the effective drag of the vehicle should increase—due to the "negative" thrust. A vehicle in level, trimmed flight may be characterized as one where the magnitude of the commanded vertical acceleration 585, $Az_{cmd}$, approximates the local acceleration of gravity, and where the angular rate of change of the angle-of-attack is approximately zero. So, if the autopilot of a vehicle in level, trimmed flight detects an airspeed 586, $\hat{v}$, dropping toward stall speed 587, $v_{min}$ for the particular angle-of-attack, the autopilot processing, so as to avoid stall, may generate a downward bias 588, $Az_{bias}$, to the acceleration command 585, $Az_{cmd}$, and thereby convert potential energy into kinetic energy, to maintain airspeed and/or reduce angle-of-attack. The acceleration command, bias, and/or error path may be limited, i.e., tested and held below threshold values that may be variable functions of estimated airspeed, in an effort to keep the air vehicle out of stall conditions.

Figure 6:
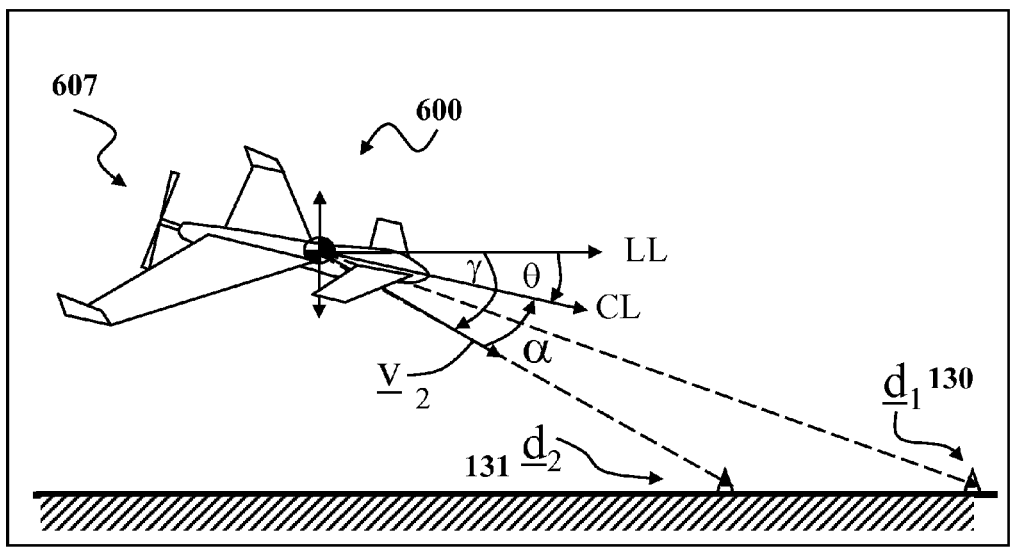
FIG. 6 depicts an exemplary air vehicle.

FIG. 6 depicts an air vehicle 600 where the pusher propeller 607 is rotating in the reverse direction of otherwise powered flight, and doing so to effectively shorten the horizontal component of the original velocity vector 110, $V_1$ (FIG. 1), and thereby generate the desired velocity vector, $V_2$—having a descent angle greater than that depicted in FIG. 1. The air vehicle 600 of FIG. 6 is depicted as having a centerline (CL) below a horizon, or local level (LL). The air vehicle 600 of FIG. 6 is depicted as having a non-zero angle-of-attack, α, and so the air vehicle 600 performs a controlled descent with airspeed maintained in equilibrium by the autopilot controlling the descent angle to compensate for the increased drag from the propeller disc. Accordingly, the air vehicle 600 is depicted as expected to arrive at a shortened downrange destination 131, $d_2$. Air vehicles relying on their horizontal tail or forward surfaces, if any, for control, in conjunction with active pitch control autopilot systems with sufficient dynamic range, are not expected to be catastrophically impacted by the pusher propeller rotating in reverse in combination with the autopilot controlling and maintaining airspeed through increased descent rate.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. An air vehicle comprising:
   at least one propeller, each propeller comprising at least one blade having a constant pitch angle;
   at least one propeller motor configured to reverse propeller rotation rate of the at least one propeller while the air vehicle is in flight; and
   an autopilot configured to maintain airspeed of the air vehicle above stall conditions using the propeller motor while the air vehicle is in flight.

2. The air vehicle of claim 1 wherein the motor is configured to drive the propeller via a propeller shaft, and wherein the motor is an electrical motor configured to drive the propeller shaft in either of two angular directions.

3. The air vehicle of claim 1 wherein the at least one propeller is at least one forward-mounted tractor propeller.

4. The air vehicle of claim 1 wherein the at least one propeller is at least one aft-mounted pusher propeller.

5. A method of in-flight augmentation of an air vehicle descent rate comprising:
   regulating, via an autopilot, an airspeed value of the air vehicle by regulating a motor; and
   generating an input to effect a change in the in-flight descent rate of the air vehicle via rotation rate reversal of at least one propeller of the air vehicle, each propeller comprising at least one blade having a constant pitch angle; and
   rotating, via the motor and responsive to the input, the propeller shaft in a direction of rotation for generating forward air vehicle thrust.

6. The method of claim 5 wherein the motor driving the at least one propeller is an electrical motor configured to drive the at least one propeller in two angular directions.

7. The air vehicle of claim 5 wherein the at least one propeller is at least one forward-mounted tractor propeller.

8. The air vehicle of claim 5 wherein the at least one propeller is at least one aft-mounted pusher propeller.

* * * * *